(12) United States Patent
Zielger et al.

(10) Patent No.: US 9,350,253 B1
(45) Date of Patent: May 24, 2016

(54) POWER SUPPLY FAULT PROTECTION CIRCUIT WITH PRIMARY SIDE SHUTDOWN AND RESTART

(71) Applicants: Markus Zielger, Munich (DE); Peng Xiao, Andover, MA (US)

(72) Inventors: Markus Zielger, Munich (DE); Peng Xiao, Andover, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/864,824

(22) Filed: Sep. 24, 2015

(51) Int. Cl.
| | | |
|---|---|---|
| G05F 1/00 | (2006.01) | |
| H05B 37/02 | (2006.01) | |
| H05B 39/04 | (2006.01) | |
| H05B 41/36 | (2006.01) | |
| H02M 3/335 | (2006.01) | |
| H02M 1/00 | (2006.01) | |

(52) U.S. Cl.
CPC ............ *H02M 3/33523* (2013.01); *H05B 37/02* (2013.01); *H02M 2001/0003* (2013.01)

(58) Field of Classification Search
None
See application file for complete search history.

(56) References Cited

U.S. PATENT DOCUMENTS

| | | | | |
|---|---|---|---|---|
| 6,366,208 | B1* | 4/2002 | Hopkins | H05B 41/2851 315/129 |
| 6,424,098 | B1* | 7/2002 | Beland | H05B 41/245 315/200 R |
| 8,933,641 | B2 | 1/2015 | De Anna et al. | |
| 2008/0018261 | A1* | 1/2008 | Kastner | F21V 23/00 315/192 |
| 2010/0054790 | A1* | 3/2010 | Inukai | G03G 15/5004 399/88 |
| 2013/0015777 | A1 | 1/2013 | De Anna et al. | |

\* cited by examiner

*Primary Examiner* — Anh Tran
(74) *Attorney, Agent, or Firm* — Shaun P. Montana

(57) ABSTRACT

Fault protection circuitry and methodologies for isolated power supply topologies are provided. The circuitry is configured to shut down the primary side of the supply in case of a system fault, while keeping the secondary side circuit running, thus offering flexibility for restarting upon clearing of the fault. A lighting driver thus configured with safety isolation and a secondary side microcontroller or other control circuitry, is configured so that the circuit can shut down the primary side in response to system fault detection, while keeping the secondary microcontroller running from an energy storage circuit (e.g., bulk capacitor in parallel with load). The driver operation can resume with a controlled timing if the fault is cleared. The number of restarts may be limited, and/or a timer may be used to space restarts. The driver may be used with loads other than lighting-based loads, as will be appreciated.

20 Claims, 3 Drawing Sheets

TO FIG. 2B

POWER SUPPLY FAULT PROTECTION CIRCUIT WITH PRIMARY SIDE SHUTDOWN AND RESTART

TECHNICAL FIELD

The present invention relates to electronics, and more specifically, to drivers that provide power to solid state light sources.

BACKGROUND

Solid state light sources receive electrical power via power supplies, also referred to as drivers or driving circuits. A typical driving circuit is configured with an isolated power supply topology, and includes a filtering capacitor in parallel with the solid state light source(s) being powered. Depending on the input power source, a bridge rectifier may also be included in the topology. In off-line drivers, there is often requirement for safety isolation, which is commonly achieved with the use of transformers and optocouplers. This isolation layer effectively divides the driver circuitry into the primary (AC) side and the secondary (load) side. In case of a fault, in certain cases it may be necessary to shut down the primary side to reduce energy delivered to the secondary side.

SUMMARY

As previously noted, it is sometimes necessary, in the case of a system fault, to shut down the primary side (i.e., AC circuit) of a power supply to reduce energy delivered to the secondary side. One prior solution to this problem is to rely on the secondary circuit to hold the shutdown condition. A drawback of this approach is that since the primary AC circuit is shutdown, the secondary energy storage for powering the auxiliary circuit is depleted very quickly. Once the auxiliary circuit is out of power, the shutdown signal is lost and the primary AC will restart. This can cause the LED driver to enter a rapid flashing mode and is very undesirable. A second prior approach is to have a latching circuit on the primary side. When the secondary circuit detects a fault, it will signal the primary circuit to shutdown, which will then hold the shutdown condition indefinitely using the latching circuit. A drawback of this solution is that the LED driver cannot restart, and AC power has to be removed and re-connected to clear the latched condition. Also, the latching circuit may be susceptible to noise and cause erratic or otherwise undesired shutdown.

Thus, embodiments provide power supply or driver circuitry that is particularly well-suited for applications where flexible fault-based shutdown of the primary side of the driver is needed. In case of a detected fault, the circuitry can shut down the primary AC circuit while still keeping the secondary auxiliary circuit operating. In addition, the circuitry allows the primary AC circuit to restart if the fault is cleared, without need for disconnecting AC power to release any latch condition. In addition, the circuitry allows the primary AC circuit to remain shutdown indefinitely if the fault is not cleared after a certain number of restarts, and the duration between restarts may be relatively long to avoid rapid flashing.

In one specific example embodiment, the driver is implemented with a flyback converter topology having primary and secondary sides separated by galvanic isolation (transformer), and is suitable for driving one or more strings of solid state light sources, or any other light source(s), or any other load(s) for that matter and as will be appreciated. In one such example case, the secondary circuitry has an energy storage capacitor to drive solid state light sources, and a microcontroller for fault detection and primary shutdown. In addition, the secondary circuitry is configured to provide a controlled restart time interval, which can be many seconds or longer to avoid rapid flashing. Note that the RC time constant associated with the storage capacitor can be used in determining the restart time interval at least to some extent, wherein the interval at which the capacitor has to be reenergized to remain charged above a given threshold directly corresponds to the restart time interval.

In an embodiment, there is provided a fault protection system for a power supply having a primary side and secondary side separated by a galvanic barrier. The fault protection system includes: a fault detection circuit configured to declare a fault mode in response to fault detection; an isolated control circuit configured to deliver a shutdown signal from the secondary side to the primary side without violating the galvanic barrier, in response to an indication of fault from the fault detection circuit; an auxiliary power circuit having an output node from which current to the fault detection circuit is provided during the fault mode; and a switch circuit configured to connect the isolated control circuit to the auxiliary power circuit during the fault mode, so that an auxiliary current can flow through the isolated control circuit to the output node of the auxiliary power circuit.

In a related embodiment, the secondary side may include a storage circuit configured to be electrically connected in parallel with a load drivable by the power supply, the auxiliary current being delivered from the storage circuit to the isolated control circuit during the fault mode. In a further related embodiment, the storage circuit may include a bulk capacitor.

In another related embodiment, the fault detection circuit may be further configured to clear the fault mode, thereby ceasing delivery of the shutdown signal to the primary side, which in turn allows the primary side of the power supply to restart. In a further related embodiment, the fault detection circuit may clear the fault mode in response to at least one of expiration of a shutdown timer, a successful fault mitigation, and a restart counter being less than a permanent shutdown threshold value. In a further related embodiment, the fault detection circuit may be configured to enter a power conserving mode while the shutdown timer is running. In another further related embodiment, the fault detection circuit may include a microcontroller.

In yet another related embodiment, the isolated control circuit may include an opto-coupler having a light emitting diode and a photo-transistor, the light emitting diode configured to pass the auxiliary current to the output node of the auxiliary power circuit via the switch circuit, and the photo-transistor configured to deliver an indication of the shutdown signal to a primary side switch circuit capable of shutting down the primary.

In still another related embodiment, the auxiliary power circuit may further include a Zener diode configured to provide a desired voltage at the output node. In a further related embodiment, the auxiliary power circuit may further include a current limiting circuit, configured so that only a pre-defined amount of current can flow to the output node, the predefined amount being within 10% or less of the auxiliary current. In a further related embodiment, the current limiting circuit may include a second Zener diode in parallel with a resistor.

In yet still another related embodiment, the switch circuit may include a first transistor that turns on in response to an output signal from the fault detection circuit and a second transistor that turns on in response to the first transistor turning on, the second transistor allowing the auxiliary current to flow from the isolated control circuit to the output node.

In another embodiment, there is provided a lighting driver. The lighting driver includes: a primary side and a secondary side separated by a galvanic barrier, wherein the secondary side includes a storage circuit configured to be electrically connected in parallel with a light source configured to be driven by the lighting driver; a fault detection circuit configured to declare a fault mode in response to fault detection, and to clear the fault mode in response to at least one of expiration of a shutdown timer, a successful fault mitigation, and a restart counter being less than a permanent shutdown threshold value; an isolated control circuit configured to deliver a shutdown signal from the secondary side to the primary side without violating the galvanic barrier, in response to an indication of fault mode from the fault detection circuit; an auxiliary power circuit having an output node from which current to the fault detection circuit is provided during the fault mode; and a switch circuit configured to connect the isolated control circuit to the auxiliary power circuit, so that an auxiliary current can flow from the storage circuit through the isolated control circuit to the output node of the auxiliary power circuit, the switch circuit comprising a first transistor that turns on in response to the shutdown signal from the fault detection circuit and a second transistor that turns on in response to the first transistor turning of, the second transistor allowing the auxiliary current to flow from the isolated control circuit to the output node.

In a related embodiment, the fault detection circuit may be configured to enter a power conserving mode while the shutdown timer is running. In another related embodiment, the isolated control circuit may include an opto-coupler having a light emitting diode and a photo-transistor, the light emitting diode configured to pass the auxiliary current to the output node of the auxiliary power circuit via the switch circuit, and the photo-transistor configured to deliver an indication of the shutdown signal to a primary side switch circuit capable of shutting down the primary.

In still another related embodiment, the auxiliary power circuit may further include a Zener diode configured to provide a desired voltage at the output node, and a current limiting circuit having a second Zener diode in parallel with a resistor and configured so only a pre-defined amount of current can flow to the output node, the predefined amount within 10% or less of the auxiliary current.

In another embodiment, there is provided a method of powering a load using a power supply having a primary side and secondary side separated by a galvanic barrier. The method includes: declaring a fault mode, via a fault detection circuit, in response to fault detection; delivering, via an isolated control circuit, a shutdown signal from the secondary side to the primary side without violating the galvanic barrier, in response to a declared fault mode from the fault detection circuit; providing an auxiliary power circuit having an output node from which current to the fault detection circuit is provided during the declared fault mode; connecting, via a switch circuit, the isolated control circuit to the auxiliary power circuit, so that an auxiliary current can flow through the isolated control circuit to the output node of the auxiliary power circuit, the switch circuit comprising a first transistor that turns on in response to the shutdown signal and a second transistor that turns on in response to the first transistor turning off, the second transistor allowing the auxiliary current to flow from the isolated control circuit to the output node.

In a related embodiment, the method may further include clearing the fault mode in response to at least one of expiration of a shutdown timer, a successful fault mitigation, and a restart counter being less than a permanent shutdown threshold value.

In a further related embodiment, the method may further include entering the fault detection circuit into a power conserving mode while the shutdown timer is running.

In another further related embodiment, the secondary side may include a storage circuit configured to be electrically connected in parallel with a load drivable by the power supply, the auxiliary current being delivered from storage circuit to the isolated control circuit during the fault mode.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments provide fault protection circuitry and methodologies for isolated power supply topologies. The circuitry is configured to shut down the primary side of the power supply in case of a system fault, while keeping the secondary side circuit running, thus offering flexibility for restarting upon clearing of the fault. Some embodiments provides a lighting driver circuit configured with safety isolation and a secondary side microcontroller, wherein the circuit can shut down the primary side in response to system fault detection, while keeping the secondary microcontroller running from an energy storage capacitor. The driver operation can resume with a controlled timing if the fault is cleared. The number of restarts may be limited, if so desired.

Although some example embodiments are provided in the context of a flyback converter, other isolated power supply topologies can also utilize the techniques provided herein for primary side shutdown, such as buck converter, boost converter, buck-boost converter, ringing choke converter, half-forward converter, push-pull converter, half-bridge and full-bridge converter, resonant converter, and Cuk converter topologies, as will be appreciated in light of this disclosure. The conversion may be, for example, from AC to AC, AC to DC, DC to AC, or DC to DC. As will be further appreciated, other loads will be apparent and the driver circuitry need not be limited to lighting applications. In addition, while microcontrollers can be used to provide additional flexibility in fault handling, the primary and/or secondary circuits of other embodiments may have no microcontroller, wherein analog or digital circuits can generate (e.g., secondary side) and/or otherwise process (e.g., primary side) the shutdown signal in case of a fault.

Figure 1:
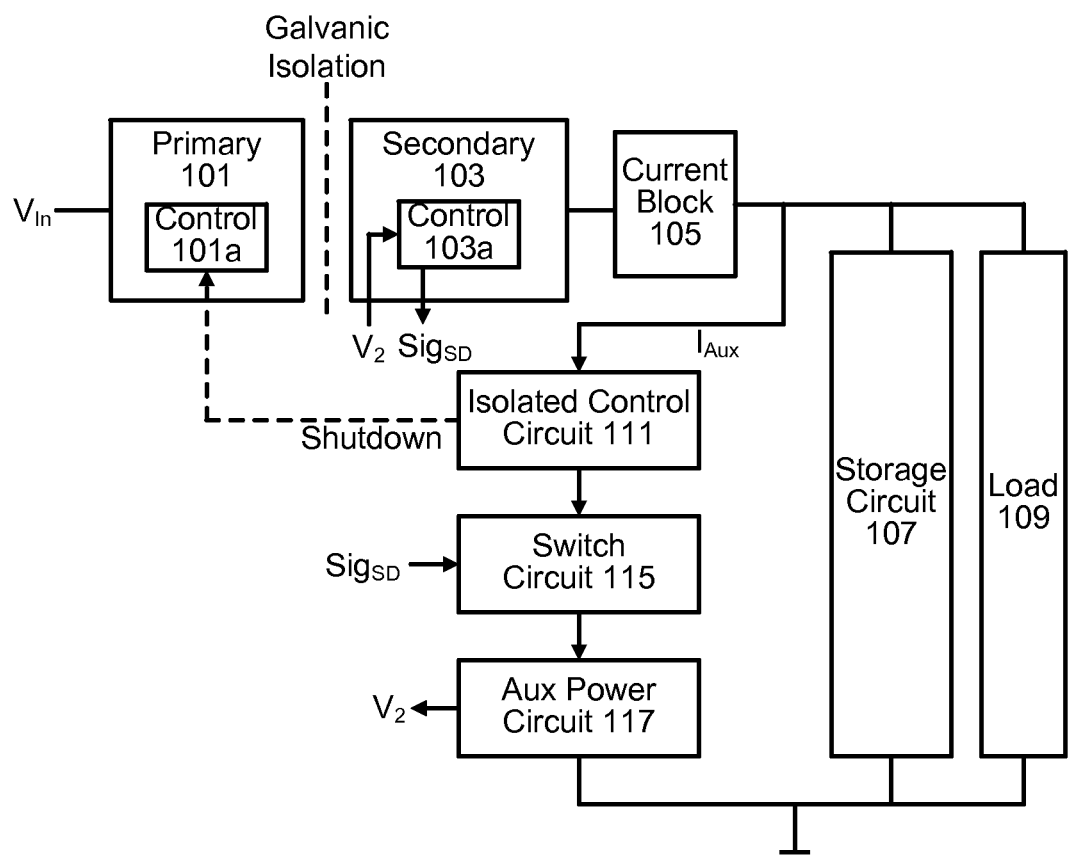
FIG. 1 illustrates a block diagram of a power supply configured with fault protection according to embodiments disclosed herein.

FIG. 1 illustrates a block diagram of a power supply configured with fault protection. As can be seen, the power supply includes a primary 101 and secondary 103 separated by galvanic isolation, such as that typical of an isolated power supply having a transformer. Various conventional details of the primary 101 and secondary 103 circuits are not shown, for ease of description and as will be appreciated. The power supply further includes a current block 105, a storage circuit 107, an isolated control circuit 111, a switch circuit 115, and an auxiliary (or aux) power circuit 117. In operation, the power supply can provide power (current/voltage) to a given load 109 under normal operating conditions, and can shut down the primary 101 while the secondary 103 remains powered, if a fault is detected. The shutdown of the primary 101 may be temporary or permanent, depending on the nature of the fault, and as will be further apparent in light of this disclosure. In the case of a permanent shutdown, the secondary 103 will stop being powered as well, once the auxiliary supply is depleted.

In more detail, a control circuit 103a is used to detect a fault based on, for instance, the value of the output voltage (for example, across the storage circuit 107) or the output current (drawn by the load 109). In any case, if a fault is detected, the control circuit 103a issues a shutdown signal $Sig_{SD}$ that causes the switch circuit 115 to activate, which in turn has the effect of connecting the isolated control circuit 111 to the auxiliary power circuit 117, so that current can begin to flow through the circuits to the load. This in turn causes the isolated control circuit 111 to issue a shutdown signal Shutdown to a control circuit 101a of the primary 101, and also causes the auxiliary power circuit 117 to begin generating an auxiliary voltage $V_2$. Once the primary 101 is shut down, the storage circuit 107 begins to slowly discharge to do two things: maintain power to the load 109 and provide auxiliary current $I_{Aux}$. Once the voltage across the storage circuit 107 drops below a given threshold, the auxiliary voltage $V_2$ also becomes depleted or otherwise insufficient to power the control circuit 103a, thereby causing the shutdown signal $Sig_{SD}$ to cease.

Once the shutdown signal $Sig_{SD}$ ceases, the primary 101 is once again enabled, which in turn allows the load 109 to be driven and the storage circuit 107 to recharged. If the fault persists, the control 103a will once again detect the fault and issue a renewed shutdown signal $Sig_{SD}$ causing the process to repeat. The number of repeats (or restarts) allowed can be limited as desired, before transitioning to a permanent shutdown. The number of restarts can be tracked, for example, using a restart counter maintained in the control 103a, wherein the counter is incremented each restart for a given failure mode session and permanent shut down is required when the counter reaches or exceeds a permanent shutdown threshold value. The timing between restarts can be stretched out based on a number of factors. For instance, the auxiliary power circuit can be configured with a current limiting circuitry, so only a pre-defined amount of current can flow to the auxiliary voltage $V_2$. This has the effect of allowing energy stored in the storage circuit 107 to be slowly utilized so as to provide power (i.e., the auxiliary voltage $V_2$) to the control circuit 103a for a relatively long time while primary is shutdown. In addition, in shutdown mode, the control circuit 103a can be further configured to disable unused features and enter a low-power sleep mode, which reduces the current consumption of the secondary side, so the energy stored in the storage circuit 107 can last an even longer time, as will be appreciated.

Each of the control circuits 101a and 103a may be, for example, and in some embodiments are, a microcontroller or a dedicated fault detection analog circuitry, or any other circuitry capable of detecting faults of interest. The current block 105 may be, and in some embodiments is, implemented, for example, with one or more diodes or other circuitry capable of blocking current from flowing from the storage circuit 107 back into the secondary 103. The storage circuit 107 is implemented, for example, with one or more capacitors or other circuitry capable of charging and discharging depending on the state of the supply. The load 109 is any electrical load, but in some embodiments comprises one or more solid state light sources.

Given the requirement for electrical isolation between the primary 101 and the secondary 103, the isolated control circuit 111 may be implemented, for example, in some embodiments, with an opto-isolator or a transformer-based circuit, or any other circuit that can provide the shutdown signal Shutdown without compromising the electrical isolation barrier (i.e., the galvanic isolation) and while being powered by the auxiliary current $I_{Aux}$. The switch circuit 115 and the auxiliary power circuit 117, in some embodiments, are collectively implemented, for example, with circuitry comprising one or more transistors, resistors, and diodes arranged to allow for passing of the auxiliary current $I_{Aux}$ in response to receiving the shutdown signal $Sig_{SD}$ and allocating a limited percentage of that auxiliary current $I_{Aux}$ for the auxiliary voltage $V_2$ supply.

Figure 2A:
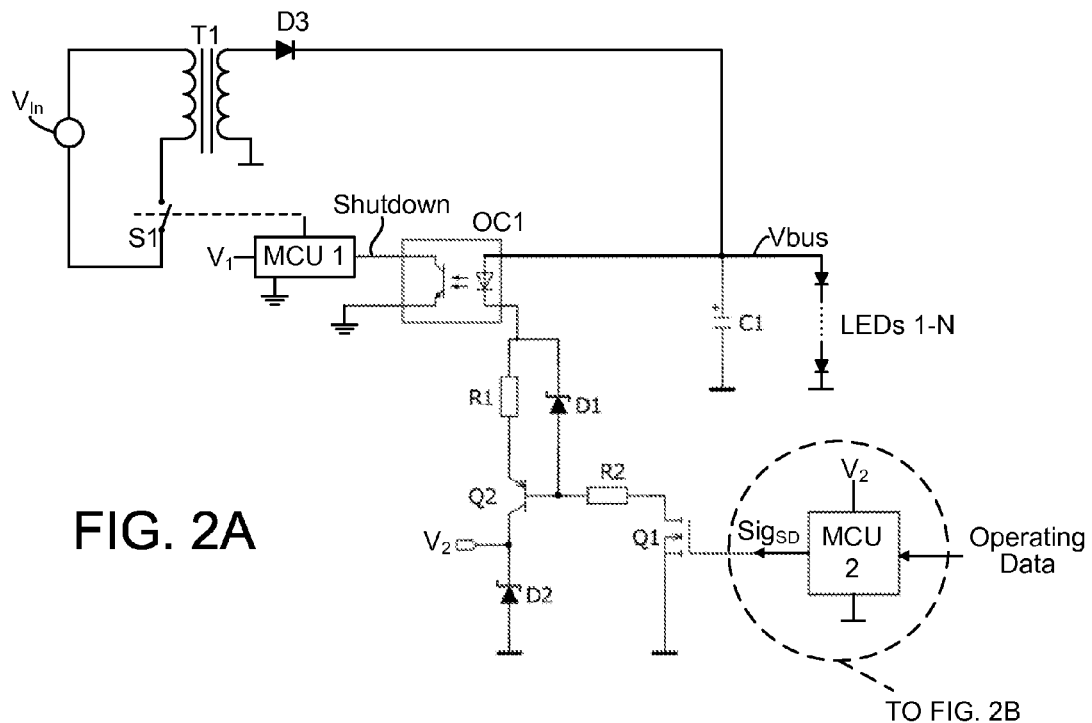
FIG. 2A illustrates a schematic diagram of a power supply configured with fault protection according to embodiments disclosed herein.

FIG. 2A illustrates a schematic diagram of a power supply configured with fault protection. As can be seen, the power supply in FIG. 2A is an lighting driver implemented with a flyback converter topology. The primary side of a transformer T1 is operatively coupled to an input voltage source $V_{In}$, and a switch S1 allows the primary side to be shut down. The primary side further includes a microcontroller MCU1 that is configured to control the switch S1 and is responsive to a shutdown signal Shutdown from the secondary side. The secondary side of the transformer T1 charges a bulk energy storage capacitor C1, which in turn provides power to a string of solid state light sources LEDs 1-N, although other loads may be, and in some embodiments are, used. A microcontroller MCU2 monitors the operation of the secondary circuits. A diode D3 prevents current from flowing from the bulk energy storage capacitor C1 into the secondary side of the transformer T1. An opto-coupler OC1 is used to provide the shutdown signal Shutdown from the secondary side to the primary side, in an isolated fashion (without violating the galvanic barrier). As will be appreciated, the opto-coupler OC1 is one example implementation of the isolated control circuit 111 shown in FIG. 1. Each of resistors R1-R2, Zener diodes D1-D2, and transistors Q1-Q2 collectively operate to provide example implementation of a switch circuit and an auxiliary power circuit (not labeled in FIG. 2A but shown in FIG. 1). The resistor R1 and a cathode of the Zener diode D1 are each connected to the opto-coupler OC1. The resistor R1 is connected to an emitter of the transistor Q2. An anode of the Zener diode D1 is connected to a base of the transistor Q2, and to the resistor R2. The resistor R2 is also connected to a source of the transistor Q1. A cathode of the Zener diode D2 is connected to a collector of the transistor Q2, and to an auxiliary power bus $V_2$. A gate of the transistor Q1 is connected to the microcontroller MCU2.

In operation, when a fault occurs, if it cannot be handled by the secondary circuit, the microcontroller MCU2 is configured to set a shutdown signal $Sig_{SD}$ to high or an otherwise active state. This turns on the transistor Q1, which turns on the transistor Q2. The transistor Q2 allows current to be delivered from the bulk energy storage capacitor C1 to the auxiliary power bus $V_2$, and keeps the microcontroller MCU2 operating. A Zener diode D2 provides a voltage reference for the auxiliary power bus $V_2$. The resistors R1 and R2 and the Zener diode D1 form a current limiting circuit, as described above, so only a pre-defined amount of current can flow to the auxiliary power bus $V_2$. Further note the Zener diode D1 maintains a constant voltage across the resistor R1 and the emitter-base junction of the transistor Q2, which generates a constant current from the bulk energy storage capacitor C1 to drive the opto-coupler OC1 and provide power for the auxiliary power bus $V_2$. This allows energy stored in the bulk energy storage capacitor C1 to be slowly utilized to provide power to the microcontroller MCU2 for a relatively long time while the primary side is shutdown. Further note that the same pre-defined amount of current also flows through the LED inside the opto-coupler OC1, thus keeping the primary circuit in a shutdown mode. Note that the use of the term "same" with respect to the current flowing through the opto-coupler OC1 and the $V_2$ node is not intended to require exact sameness, given realities such as leakage currents. To this end, "same" as used in this context is intended to mean that the current flowing through the opto-coupler OC1 is the same as the current flowing in the $V_2$ node, or within an acceptable tolerance thereof (e.g., such that the respective currents are within 10% or less of each other, or within 5% or less of each other, or within 2% or less of each other, or within 1% or less of each other). Table 1 below shows some example component values that can be used in accordance with one embodiment of the present disclosure.

TABLE 1

Example Circuit Values/Part Numbers

| Component | Example Value/Part |
|---|---|
| D1 | 3.9 V |
| D2 | 5 V |
| R1 | 1k |
| R2 | 120k |
| Q1 | BSS123 |
| Q2 | MMBT5401 |
| Vbus | 60~80 V |
| $V_2$ | 5 V |
| OC1 | TLP-185 |

Furthermore, the microcontroller MCU2, in some embodiments, is programmed or otherwise configured to, once in shutdown mode, disable all unused features and enter a low-power sleep mode, or other power conserving mode. This may be done to further reduce the current consumption of the secondary side, so the auxiliary energy stored in the bulk energy storage capacitor C1 can last an even longer time. Depending on the nature of the fault, a restart may be desirable to turn the solid state light sources LEDs 1-N on in case the fault is cleared (e.g., due to successful fault mitigation by the power supply, or removal of the conditions causing the fault). In some embodiments, this can be achieved by setting a timer in the microcontroller MCU2 to wake up the microcontroller MCU2 from sleep mode. When the microcontroller MCU2 wakes up, it can clear the shutdown signal $Sig_{SD}$ to allow the primary source (AC or DC) to restart. It is thus possible to schedule restart at pre-defined intervals, without causing undesirable rapid flashing of light emitted by the solid state light sources LEDs 1-N. In some embodiments, no timer is used; rather, the fault condition is cleared when testing performed by the microcontroller MCU2 indicates the fault has been mitigated. A combination of such factors may also be considered when clearing faults.

As will be further appreciated, it is also possible to keep the primary circuit in shutdown mode indefinitely. This is achieved by having the microcontroller MCU2 stay in sleep mode without a scheduled wakeup. As the voltage across the bulk energy storage capacitor C1 is reduced, the current through the opto-coupler OC1 also decreases. At a certain point, the opto-coupler OC1 will not be able to hold the primary side of the converter in shutdown mode. However, once the primary side of the converter restarts, the bulk energy storage capacitor C1 will be re-charged to a higher voltage, which in turn provides enough current through the opto-coupler OC1 to shut down the primary circuit again should the fault reappear or otherwise fail to resolve. This feature is useful to keep the light off after a pre-defined number of restart attempts is reached.

As previously explained, although FIG. 2A is shown and described in the context of a flyback converter, other isolated power supply topologies can also utilize the techniques provided herein for primary side shutdown. Likewise, while the load depicted in FIG. 2A is a lighting load, a driver topology configured in accordance with an embodiment of the present disclosure can be used with any other loads. In addition, recall that other embodiments may have no microcontroller on the primary side (e.g., no microcontroller MCU1), the secondary side (e.g., no microcontroller MCU2), or on either side, assuming that additional functionality provided by such microcontroller(s) is not desired.

Figure 2B:
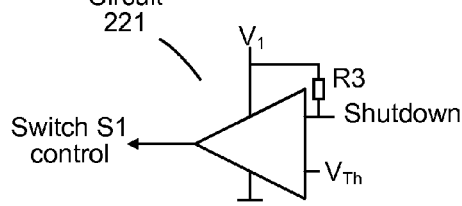
FIG. 2B illustrates an alternative primary shutdown circuit that can be used instead of a microcontroller according to embodiments disclosed herein.

FIG. 2B illustrates a primary shutdown circuit 221 that, in some embodiments, replaces the microcontroller MCU1 shown in FIG. 2A. As can be seen, the primary shutdown circuit 221 includes a comparator circuit that generates the control signal for the switch S1. In operation, the shutdown signal Shutdown provided by the opto-coupler OC1 of FIG. 2A is received at one input of the comparator circuit, and the other input is tied to a reference threshold voltage $V_{Th}$. If the shutdown signal Shutdown is less than or equal to the reference threshold voltage $V_{Th}$, this indicates that the secondary circuit has issued a primary shutdown signal $Sig_{SD}$ and the comparator therefore outputs a first voltage suitable to cause the switch S1 to remain open, which in turn shuts down the primary. On the other hand, if the shutdown signal Shutdown is greater than the reference threshold voltage $V_{Th}$, this indicates that the secondary circuit has ceased or otherwise failed to issue the primary shutdown signal $Sig_{SD}$, and that a pull-up resistor R3 caused the input of the comparator to be equal to a VCC voltage $V_1$. The comparator therefore outputs a second voltage suitable to cause the switch S1 to close, which in turn engages the primary until a new fault condition occurs.

Figure 2C:
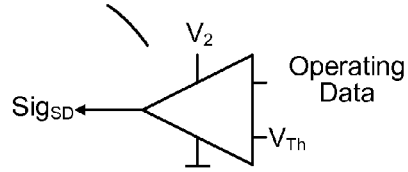
FIG. 2C illustrates an alternative fault detection circuit that can be used instead of a microcontroller according to embodiments disclosed herein.

FIG. 2C illustrates a fault detection circuit 223 that, in some embodiments, replaces the microcontroller MCU2. As can be seen, the fault detection circuit 223 includes a comparator circuit that generates the control (gate) signal for the transistor Q1 of FIG. 2A. In operation, data Operating Data is received at one input of the comparator, and the other input is tied to a reference threshold voltage $V_{Th}$. The data Operating Data is, in some embodiments, for example, a sample of the output voltage (e.g., across the bulk energy storage capacitor C1) or the current drawn by the load (e.g., current through the solid state light sources LEDs 1-N). A combination of such data points may also be monitored, as commonly done. If the data Operating Data is less than or equal to the reference threshold voltage $V_{Th}$, this indicates that the data Operating Data is within specification, and the comparator therefore outputs the primary shutdown signal $Sig_{SD}$ in its first state, which causes the transistor Q1 to remain open. On the other hand, if the data Operating Data is greater than the reference threshold voltage $V_{Th}$, this indicates that the data Operating Data is out of specification (failure mode), and the comparator therefore outputs the primary shutdown signal $Sig_{SD}$ in its second state, which causes the transistor Q1 to close, which engages the primary shutdown circuit as previously discussed with reference to FIG. 2A. Further note that the comparator is powered by the auxiliary power bus $V_2$, and will cease to provide the shutdown signal when the auxiliary power bus $V_2$ diminishes below a certain voltage level.

Numerous other control schemes variations will be apparent in light of this disclosure. For instance, depending on the driver implementation details, the bulk energy storage capacitor C1 can be directly in parallel with the output load (as shown in FIG. 2A), or alternatively before a constant-current generating block. In any such cases, note that the energy storage circuit 107 (e.g., the bulk energy storage capacitor C1) can provide power to keep the primary in shutdown, while also keeping the secondary control circuit 103a (e.g., the microcontroller MCU2 or the fault detection circuit 223) alive. This allows longer shutdown time and avoids fast flashing/strobing of output light in embodiments such as shown in FIG. 2A.

Figure 3:
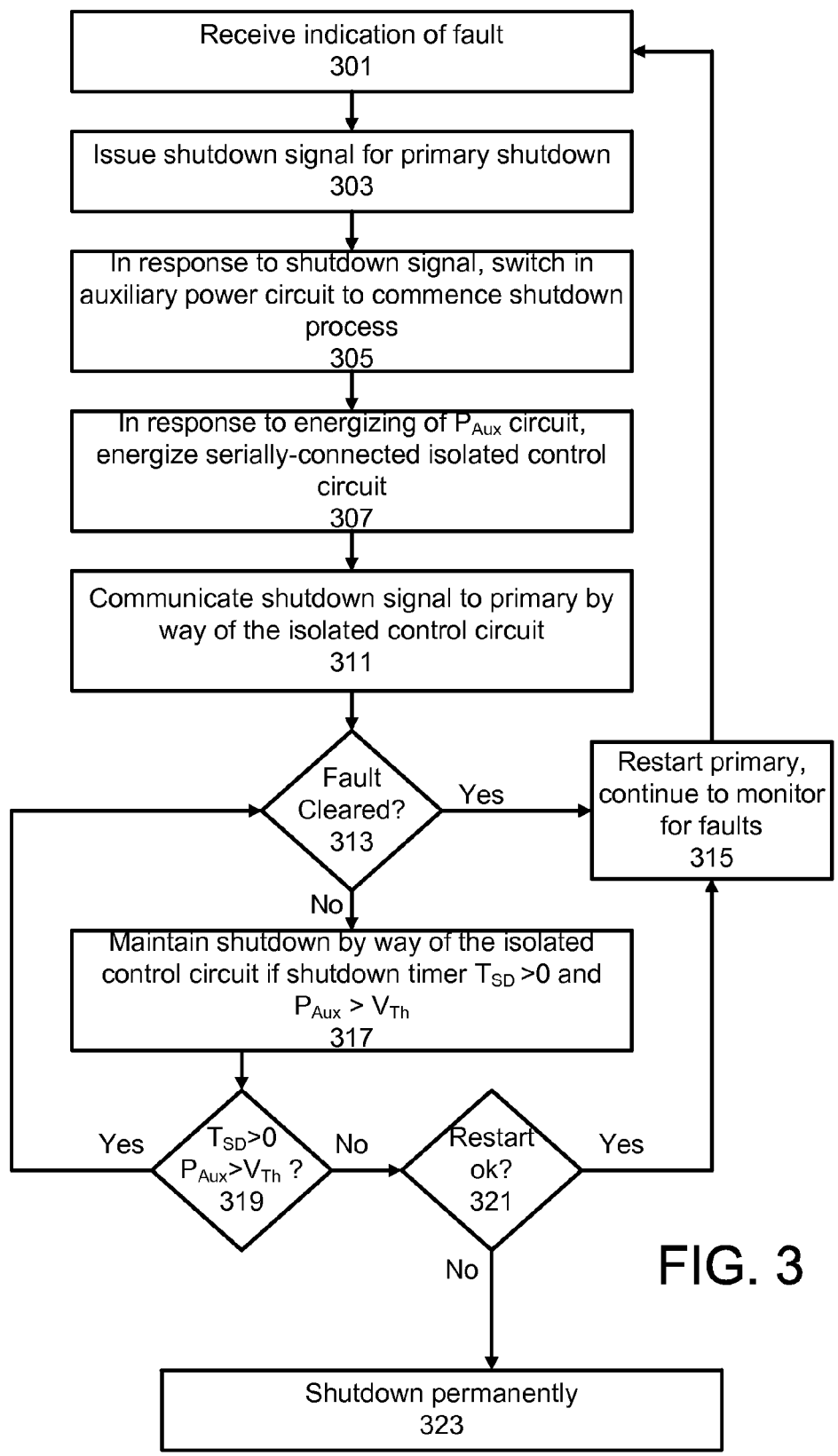
FIG. 3 illustrates a power supply methodology to provide fault protection according to embodiments disclosed herein.

A flowchart of a method is depicted in FIG. 3. The rectangular elements are herein denoted "processing blocks" and represent instructions, including in some embodiments computer software instructions, or groups of instructions. The diamond shaped elements, are herein denoted "decision blocks," represent instructions, including some embodiments computer software instructions, or groups of instructions, which affect the execution of the instructions represented by the processing blocks. Alternatively, the processing and decision blocks represent steps performed by functionally equivalent circuits such as a digital signal processor circuit or an application specific integrated circuit (ASIC), or the systems shown in FIGS. 1-2C. Where involving software, the flowchart does not depict the syntax of any particular programming language. Rather, the flowchart illustrates the functional information one of ordinary skill in the art requires to fabricate circuits or to generate computer software to perform the processing required in accordance with embodiments disclosed throughout. It should be noted that, for software, many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Further, while FIG. 3 illustrates various operations, it is to be understood that not all of the operations depicted in FIG. 3 are necessary for other embodiments to function. Indeed, it is fully contemplated herein that in other embodiments of the present disclosure, the operations depicted in FIG. 3, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

More specifically, FIG. 3 illustrates a power supply methodology to carry out fault protection. The method can be carried out, for example, by any of the embodiments shown in FIG. 1 or FIGS. 2A-C, although any number of other configurations will be apparent in light of this disclosure. The method allows a power supply to be selectively shutdown in response to a fault mode detection and restarted without rapid flashing, while effort is made to remedy the fault. If the fault cannot be cleared, the method may result in the power supply being permanently shut down, as will now be discussed in more detail.

The method includes receiving 301 an indication of fault, and issuing 303 a shutdown signal for primary shutdown. The fault may be detected by, for example, an microcontroller or an analog fault detection circuit as previously explained. The fault can be based on any given operating parameter not being within a desired specification. In response to a shutdown signal being issued, the method continues with switching 305 in an auxiliary power circuit to commence the primary shutdown process, which largely operates on the second side of the power supply topology, except for the delivery of a shutdown signal to the primary side of the topology.

In more detail, in response to the auxiliary power circuit being energized or otherwise switched into the secondary circuit, the method further includes energizing 307 a serially-connected isolated control circuit, and issuing or otherwise communicating 311 a shutdown signal to the primary by way of the isolated control circuit. Recall that the isolated control circuit may be, for example, an opto-coupler (e.g., the opto-coupler OC1), which can be connected in series with a switching circuit (e.g., the switch circuit 115) and an auxiliary power circuit (e.g., the auxiliary power circuit 117) so that a common current flows therethrough. The method continues with determining 313 whether or not the detected fault has cleared. If so, the method further includes restarting 315 the primary, and continuing to monitor for faults.

On the other hand, if the detected fault has not cleared, the method continues with maintaining 317 the primary shutdown by way of the isolated control circuit. In this example embodiment, the shutdown condition can be maintained based on two considerations. The first consideration is whether a shutdown timer $T_{SD}$ is greater than zero, meaning that it is not yet time for the next scheduled restart. Such a timer can be maintained, for instance, in the secondary control circuit (e.g., the microcontroller MCU2), and can be used to space out restarts to a relatively long interval (e.g., many seconds to many minutes, or longer), as desired. The second consideration is whether the auxiliary power $P_{Aux}$ is greater than the minimum threshold voltage $V_{Th}$ needed to the keep the secondary shutdown circuit operating. The minimum threshold voltage $V_{Th}$ may, and in some embodiments does, vary, and will depend on whether the isolated control circuit or the auxiliary power circuit fail first and at what voltage, as will be appreciated. Other embodiments may just have a timer consideration, or only consider how long the auxiliary power $P_{Aux}$ can remain at or above the minimum threshold voltage $V_{Th}$, or some other factor(s).

So, the method may continue with assessing the more or more factors upon which maintaining shutdown is based. In FIG. 3, for instance, if it is determined at 319 that the shutdown timer $T_{SD}$ is greater than zero, and the auxiliary power $P_{Aux}$ is greater than the minimum threshold voltage $V_{Th}$, then the method repeats at 313 to assess whether or not the detected fault has cleared, and proceeds from there as previously explained. If, on the other hand, at least one of the shutdown timer $T_{SD}$ is not greater than zero, and the auxiliary power $P_{Aux}$ is not greater than the minimum threshold voltage $V_{Th}$, then the method continues with determining 321 if a restart is appropriate.

The determination can be based on, for example, a predefined number of restarts that is allowable for a given period of time. The determination may also be based on the severity or type of fault. Any such factors can be assessed (e.g., by the microcontroller MCU2 or other suitable analysis circuitry) to inform the decision as to whether a restart is appropriate. If a restart is appropriate, then the method repeats at 315 with restarting the primary and proceeds from there are previously explained. If, on the other hand, a restart is not allowed, then the method continues with a permanent shutdown of the primary at 323. A service call for maintenance action can be made at that time.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A fault protection system for a power supply having a primary side and secondary side separated by a galvanic barrier, the system comprising:
   a fault detection circuit configured to declare a fault mode in response to fault detection;
   an isolated control circuit configured to deliver a shutdown signal from the secondary side to the primary side without violating the galvanic barrier, in response to an indication of fault from the fault detection circuit;

an auxiliary power circuit having an output node from which current to the fault detection circuit is provided during the fault mode; and a switch circuit configured to connect the isolated control circuit to the auxiliary power circuit during the fault mode, so that an auxiliary current can flow through the isolated control circuit to the output node of the auxiliary power circuit.

2. The fault protection system of claim 1, wherein the secondary side includes a storage circuit configured to be electrically connected in parallel with a load drivable by the power supply, the auxiliary current being delivered from the storage circuit to the isolated control circuit during the fault mode.

3. The fault protection system of claim 2, wherein the storage circuit comprises a bulk capacitor.

4. The fault protection system of claim 1, wherein the fault detection circuit is further configured to clear the fault mode, thereby ceasing delivery of the shutdown signal to the primary side, which in turn allows the primary side of the power supply to restart.

5. The fault protection system of claim 4, wherein the fault detection circuit clears the fault mode in response to at least one of expiration of a shutdown timer, a successful fault mitigation, and a restart counter being less than a permanent shutdown threshold value.

6. The fault protection system of claim 5, wherein the fault detection circuit is configured to enter a power conserving mode while the shutdown timer is running.

7. The fault protection system of claim 5, wherein the fault detection circuit comprises a microcontroller.

8. The fault protection system of claim 1, wherein the isolated control circuit comprises an opto-coupler having a light emitting diode and a photo-transistor, the light emitting diode configured to pass the auxiliary current to the output node of the auxiliary power circuit via the switch circuit, and the photo-transistor configured to deliver an indication of the shutdown signal to a primary side switch circuit capable of shutting down the primary.

9. The fault protection system of claim 1, wherein the auxiliary power circuit further comprises a Zener diode configured to provide a desired voltage at the output node.

10. The fault protection system of claim 9, wherein the auxiliary power circuit further comprises a current limiting circuit, configured so that only a pre-defined amount of current can flow to the output node, the predefined amount being within 10% or less of the auxiliary current.

11. The fault protection system of claim 10, wherein the current limiting circuit comprises a second Zener diode in parallel with a resistor.

12. The fault protection system of claim 1, wherein the switch circuit comprises a first transistor that turns on in response to an output signal from the fault detection circuit and a second transistor that turns on in response to the first transistor turning on, the second transistor allowing the auxiliary current to flow from the isolated control circuit to the output node.

13. A lighting driver, comprising:
a primary side and a secondary side separated by a galvanic barrier, wherein the secondary side includes a storage circuit configured to be electrically connected in parallel with a light source configured to be driven by the lighting driver;
a fault detection circuit configured to declare a fault mode in response to fault detection, and to clear the fault mode in response to at least one of expiration of a shutdown timer, a successful fault mitigation, and a restart counter being less than a permanent shutdown threshold value;
an isolated control circuit configured to deliver a shutdown signal from the secondary side to the primary side without violating the galvanic barrier, in response to an indication of fault mode from the fault detection circuit;
an auxiliary power circuit having an output node from which current to the fault detection circuit is provided during the fault mode; and
a switch circuit configured to connect the isolated control circuit to the auxiliary power circuit, so that an auxiliary current can flow from the storage circuit through the isolated control circuit to the output node of the auxiliary power circuit, the switch circuit comprising a first transistor that turns on in response to the shutdown signal from the fault detection circuit and a second transistor that turns on in response to the first transistor turning of, the second transistor allowing the auxiliary current to flow from the isolated control circuit to the output node.

14. The lighting driver of claim 13, wherein the fault detection circuit is configured to enter a power conserving mode while the shutdown timer is running.

15. The lighting driver of claim 13, wherein the isolated control circuit comprises an opto-coupler having a light emitting diode and a photo-transistor, the light emitting diode configured to pass the auxiliary current to the output node of the auxiliary power circuit via the switch circuit, and the photo-transistor configured to deliver an indication of the shutdown signal to a primary side switch circuit capable of shutting down the primary.

16. The lighting driver of claim 13, wherein the auxiliary power circuit further comprises a Zener diode configured to provide a desired voltage at the output node, and a current limiting circuit having a second Zener diode in parallel with a resistor and configured so only a pre-defined amount of current can flow to the output node, the predefined amount within 10% or less of the auxiliary current.

17. A method of powering a load using a power supply having a primary side and secondary side separated by a galvanic barrier, the method comprising:
declaring a fault mode, via a fault detection circuit, in response to fault detection;
delivering, via an isolated control circuit, a shutdown signal from the secondary side to the primary side without violating the galvanic barrier, in response to a declared fault mode from the fault detection circuit;
providing an auxiliary power circuit having an output node from which current to the fault detection circuit is provided during the declared fault mode;
connecting, via a switch circuit, the isolated control circuit to the auxiliary power circuit, so that an auxiliary current can flow through the isolated control circuit to the output node of the auxiliary power circuit, the switch circuit comprising a first transistor that turns on in response to the shutdown signal and a second transistor that turns on in response to the first transistor turning off, the second transistor allowing the auxiliary current to flow from the isolated control circuit to the output node.

18. The method of claim 17, further comprising:
clearing the fault mode in response to at least one of expiration of a shutdown timer, a successful fault mitigation, and a restart counter being less than a permanent shutdown threshold value.

19. The method of claim 18, further comprising:
entering the fault detection circuit into a power conserving mode while the shutdown timer is running.

20. The method of claim 18, wherein the secondary side includes a storage circuit configured to be electrically connected in parallel with a load drivable by the power supply, the auxiliary current being delivered from storage circuit to the isolated control circuit during the fault mode.

\* \* \* \* \*